(12) United States Patent
Al Rashini

(10) Patent No.: US 12,411,805 B2
(45) Date of Patent: Sep. 9, 2025

(54) METHOD AND SYSTEM FOR REFERENCING DATA

(71) Applicant: Tomicic Consulting AB, Åby (SE)

(72) Inventor: Ali Al Rashini, Norrköping (SE)

(73) Assignee: TOMICIC CONSULTING AB, Åby (SE)

( * ) Notice: Subject to any disclaimer, the term of this patent is extended or adjusted under 35 U.S.C. 154(b) by 0 days.

(21) Appl. No.: 18/851,784

(22) PCT Filed: Mar. 25, 2024

(86) PCT No.: PCT/SE2024/050264
§ 371 (c)(1),
(2) Date: Sep. 27, 2024

(87) PCT Pub. No.: WO2024/205468
PCT Pub. Date: Oct. 3, 2024

(65) Prior Publication Data
US 2025/0110922 A1  Apr. 3, 2025

(30) Foreign Application Priority Data
Mar. 30, 2023  (SE) .................................... 2350371-7

(51) Int. Cl.
*G06F 16/00* (2019.01)
*G06F 16/13* (2019.01)

(52) U.S. Cl.
CPC .................................. *G06F 16/13* (2019.01)

(58) Field of Classification Search
CPC ...................................................... G06F 16/13
(Continued)

(56) References Cited

U.S. PATENT DOCUMENTS

| | | | |
|---|---|---|---|
| 7,574,409 B2 * | 8/2009 | Patinkin | H04L 51/212 706/12 |
| 10,503,516 B1 | 12/2019 | Faibish et al. | |
| 10,762,051 B1 * | 9/2020 | Bhagavandas | G06F 16/113 |

(Continued)

FOREIGN PATENT DOCUMENTS

| | | |
|---|---|---|
| CN | 114048276 A | 2/2022 |
| EP | 1995877 A1 | 11/2008 |

OTHER PUBLICATIONS

International Search Report and Written Opinion mailed on May 21, 2024, received for PCT Application PCT/SE2024/050264, filed on Mar. 25, 2024, 10 pages.

(Continued)

*Primary Examiner* — Michelle N Owyang
(74) *Attorney, Agent, or Firm* — XSENSUS LLP

(57) ABSTRACT

A method is provided for referencing data. The method comprises receiving a request including data to be stored. Decomposing the data to be stored byte to byte into a plurality of bytes. Each byte of the data being represented by a key value. Vectorizing the decomposed data to obtain a first vector for the data to be stored. The first vector comprises at least one pair of values. Each pair of values comprising a first value and a second value. The first value represents one or more bytes having a unique key value in the decomposed data. The second value indicates instances of the one or more bytes having the unique key value presented in the decomposed data. Determining whether the vectorized data exists in the one or more data centers. Returning a reference for the data to be stored based on a result of the determining step.

20 Claims, 3 Drawing Sheets

(58) Field of Classification Search
USPC .................................................. 707/600–899
See application file for complete search history.

(56) References Cited

U.S. PATENT DOCUMENTS

| | | | |
|---|---|---|---|
| 11,010,485 B1 | 5/2021 | Devlin et al. | |
| 11,416,466 B2 | 8/2022 | Hazel et al. | |
| 11,520,780 B2 | 12/2022 | Boodman et al. | |
| 2005/0091234 A1 | 4/2005 | Hsu et al. | |
| 2010/0205163 A1 | 8/2010 | Eshghi et al. | |
| 2011/0099351 A1* | 4/2011 | Condict | G06F 3/0608 |
| | | | 711/216 |
| 2015/0189047 A1* | 7/2015 | Naaman | G06F 16/90 |
| | | | 370/474 |
| 2017/0083408 A1 | 3/2017 | Vijayan | |
| 2019/0012237 A1 | 1/2019 | Prahlad et al. | |
| 2020/0012569 A1 | 1/2020 | Natanzon et al. | |
| 2021/0182479 A1* | 6/2021 | Kim | G06F 40/194 |
| 2021/0319174 A1 | 10/2021 | Raj et al. | |
| 2022/0188198 A1 | 6/2022 | Nagarajegowda et al. | |
| 2022/0245097 A1 | 8/2022 | Moran et al. | |
| 2023/0079753 A1 | 3/2023 | Karlberg et al. | |
| 2024/0419647 A1* | 12/2024 | Xu | G06F 16/23 |

OTHER PUBLICATIONS

Swedish Search Report mailed on Nov. 22, 2023, received for EP Application 2350371-7, filed on Mar. 30, 2023, 3 pages.

* cited by examiner

METHOD AND SYSTEM FOR REFERENCING DATA

Cross-Reference to Related Applications

This application is a national stage application, pursuant to 35 U.S.C. § 371, of International Patent Application No. PCT/SE2024/050264, filed Mar. 25, 2024, which claims priority to SE Application No. 2350371-7, filed Mar. 30, 2023, the entire contents of each are incorporated herein by reference.

TECHNICAL FIELD

The present disclosure generally relates to the field of data science, and in particular, to a method for referencing data, locally or remotely as well as a system capable of performing the method thereof.

BACKGROUND

Data centers are often used to store and share applications and data. Data centers are designed based on a computer network and storage resources that enable transmission of the shared applications and data. The data center may comprise servers, data storage systems, networking equipment, such as routers and switches, and security systems such as firewalls and encryption systems.

The size of the data centers is ever-growing with increased and uncontrolled demand for storing more information. For example, storing data and applications in the data centers. The servers in data centers are computer hardware and/or software programs that provide services for other programs or devices, such as clients. Servers are usually categorized in terms of their purposes. Some examples of such server categories are a web server, application server, proxy server, virtual server, file server, database server and printer server. For example, the purpose of database servers is that they are responsible for hosting one or more databases. Client applications may perform database queries that retrieve data from or write data to the database that is hosted by the server. Another example is the file server, a server that is responsible for storage and management of data files (such as text, image, sound, picture, video) so that the computers on the same network can access them when required.

The design of the file servers is complicated by competing demands for storage space, access speed, recoverability, security and budget. This is further complicated by a constantly changing environment, where new hardware and technology rapidly obsolesce old equipment. The storage space at the servers is rapidly filled up with never ending generation of new data, demanding more servers for storing new or modified data, which requires more infrastructure, resulting in additional cost, space, and energy requirements.

Furthermore, security of the data stored and shared in the data centers is always a focus issue.

The disadvantage of the present methods and/or systems of storing/sharing data or files in data centers is that the data centers will infinitely grow over time with more files or data people share or store over the internet. This results in constant increasing costs of both size and maintenance for the data centers, Another disadvantage of the present methods and/or systems of storing/sharing data or files in data centers is cyber-attacks. If the data centers are attacked by hackers, intentionally or unintentionally, there would be high risk of data breach, which is not expected by the users.

SUMMARY

Thus, it would be advantageous to achieve a method and a system to overcome, or at least alleviate, the above-mentioned drawbacks. In particular, it would be desirable to recycle the data already stored in the data centers and ensure the security of the data stored in the data centers. To better address one or more of these concerns, a method, a system, and a non-transitory, computer-readable storage medium, having stored there on a computer program having the features defined in the method claim are provided. Preferable embodiments are defined in the dependent claims.

Hence, according to a first aspect, a method is provided for referencing data, performed by a processor operatively connected with one or more data centers in a network. Each of the one or more data centers is configured to store files and corresponding vectors of the files. The method comprises receiving a request including data to be stored; decomposing the data to be stored byte to byte into a plurality of bytes. Each byte of the data is represented by a key value. The method further comprises vectorizing the decomposed data to obtain a first vector for the data to be stored. The first vector comprises at least one pair of values. Each pair of values comprises a first value and a second value. The first value represents one or more bytes having a unique key value in the decomposed data. The second value indicates instances of the one or more bytes having the unique key value presented in the decomposed data. The method further comprises determining whether the vectorized data exists in the one or more data centers and returning a reference for the data to be stored based on a result of the determining step.

An advantage associated with the present invention is that the method allows efficient recycling of data already available, maybe in a storage device located locally or a shared device over the internet. This results in almost fixed-sized data centers, even though the data intended to be shared or stored is constantly increasing. With the almost fixed-sized data centers, that means, even though the data intended to be shared or stored is constantly increasing, i.e., the information stored in the data centers will constantly increase whilst not increasing the physical size of the data centers as in traditional data centers, because of the recycling of data already stored in the data centers. In other words, the method drastically reduces the speed at which the physical size of the data centers increases compared to the intended data to be added to the data centers.

The term file represents any type of data file, for example, text, image, sound, picture, video. The data file may comprise byte sequences. Each byte sequence may include one or more bytes.

The term key value is used to represent a byte in data. All the bytes in the data may be represented by a corresponding key value. The data can be represented using different numeral systems. For example, the decimal numeral system, the binary number system, the octal number system, the hexadecimal number system. For instance, if the data is represented in a hexadecimal number system, each byte in the data is represented by a hex value. The hex values are the key values for the bytes in the data.

The term vector is used to represent the data using only unique key values of the data. The vector comprises at least one pair of values. Each pair of values comprises a first value and a second value. The first value represents one or more bytes having a unique key value in the data, and the second value indicates instances of the one or more bytes having the unique key value presented in the data. The vector, comprising at least one pair of values, may comprise all unique key values that may exist in the data as the first values of the at least one value pairs. For example, the data may be represented by hexadecimal values. In such case, each pair of values in the vector may comprise a first value having a unique hex value presented in the hexadecimal data, and a second value indicating instances of one or more bytes having the unique hex value presented in the hexadecimal data. The vector, comprising at least one pair of values, may comprise all unique hex values as the first values that may exist in the hexadecimal data.

The phrase one or more data centers is used to represent the data centers capable of storing the files and vectors thereof.

According to some embodiments of the invention, the determining whether the vectorized data exists in the one or more data centers and returning a reference for the data to be stored based on a result of the determining step may further comprise, comparing the first vector with the vectors in the one or more data centers. If the first vector exists in the one or more data centers, determining whether the data to be stored is a duplicate of a first file already in the one or more data centers. The first file is corresponding to a vector having the same value pairs as the first vector. If the data to be stored is a duplicate of the first file already in the one or more data centers, returning the reference to the user. The reference is a reference ID of the first file already in the one or more data centers.

According to some embodiments of the invention, the determining whether the vectorized data exists in the one or more data centers may further comprise, comparing the first vector with the vectors in the one or more data centers. If the first vector does not exist in any of the one or more data centers or the data to be stored is not a duplicate of the first file already in the one or more data centers, choosing a vector in the one or more data centers with the highest similarity value compared with the first vector. The determining whether the 10 vectorized data exists in the one or more data centers may further comprise determining one or more duplicate byte sequences both in the data to be stored and a second file corresponding to the chosen vector in the one or more data centers, wherein the length of the duplicate byte sequences is equal or less than a first threshold value. And the returning a reference for the data to be stored may further comprise returning a first reference, the first reference comprising one or more sub-references, each sub-reference corresponding to one of the duplicate byte sequences respectively, and each sub-reference comprising an index and a range of the duplicate byte sequences in the second file.

According to some embodiments of the invention, the method may further comprise injecting one or more byte sequences which are not found in the second file, wherein the length of the byte sequences which are not found is less than a second threshold value.

According to some embodiments of the invention, the method may further comprise: vectorizing each of the byte sequences which are not found in the second file to obtain a respective second vector, wherein the length of each of the byte sequences which are not found in the second file is equal or greater than the second threshold value. The following steps are performed for each of the byte sequences: (i) determining whether the second vector exists in the one or more data centers. (ii) If the second vector exists in the one or more data centers, determining whether the byte sequence has a duplicate in a third file already in the one or more data centers, wherein the third file is corresponding to a vector having the same value pairs as the second vector. (iii) If the byte sequence has a duplicate in the third file, returning a second reference. The second reference is a reference ID of the third file or comprises an index and a range of the duplicate bytes in the third file. (iv) If the second vector does exist in the one or more data centers or the byte sequence has no duplicate in the third file, adding the byte sequence into the one or more data centers and returning a third reference. The third reference is a reference ID of the byte sequences having no duplicate in the third file.

According to some embodiments of the invention, the returned reference for the data to be stored may comprise at least one of the first reference, the injected byte sequences, one or more the second reference and one or more the third reference.

According to some embodiments of the invention, the method may further comprise recomposing the data to be stored based on the reference.

According to some embodiments of the invention, the decomposing the data to be stored byte to byte may comprise representing each byte in a hexadecimal form.

According to a second aspect, a system for referencing data comprising a processor and a memory having stored thereon instructions. The instructions when executed by the processor, causing the processor to perform the method According to a third aspect, a non-transitory, computer-readable storage medium having stored thereon instructions. The instructions when executed by a computer, cause the computer to perform the method of the first aspect.

The method and system benefit from the idea that the reference, instead of the complete data to stored or shared, is returned when the data is to be stored or shared. Therefore only the reference of the data instead of the complete data is stored at the user terminal, the complete data can be obtained through the reference of the data. Thus the storage size for the data storage at the user side is reduced. Furthermore, since all data stored in the data centers can be recycled and combined into different data, it is not necessary to save the complete data each time when the data is intended to be added into the data centers, the size of the data centers can be controlled into an almost fixed-size.

The method and system may further benefit from the idea that all data stored in the data centers may be recycled and combined into different data, thus the security of the data stored therein is significantly improved.

BRIEF DESCRIPTION OF THE DRAWINGS

These and other aspects will now be described in more detail with reference to the appended drawings showing embodiments.

All the figures are schematic, not necessarily to scale, and generally only show parts which are necessary in order to elucidate the embodiments, wherein other parts may be

DETAILED DESCRIPTION

The present aspects will now be described more fully hereinafter with reference to the accompanying drawings, in which currently preferred embodiments are shown. These aspects may, however, be embodied in many different forms and should not be construed as limited to the embodiments set forth herein; rather, these embodiments are provided for thoroughness and completeness, and fully convey the scope of the present aspects to those skilled in art.

Figure 1:
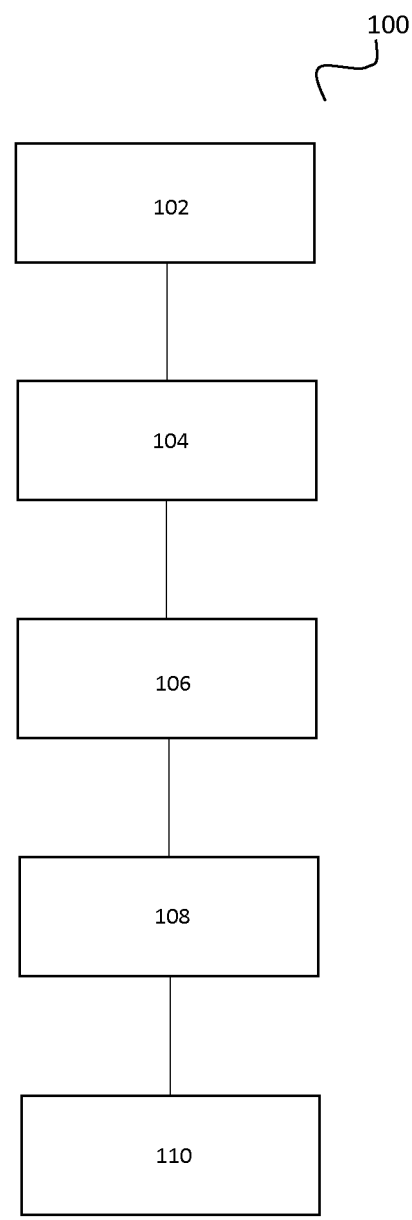
FIG. 1 shows an exemplary flow chart for a method for referencing data, performed by a processor operatively connected with one or more data centers in a network.

Referring to FIG. 1, a flow chart is illustrated for a method 100 for referencing data, performed by a processor operatively connected with one or more data centers in a network. Each of the one or more data centers is configured to store files and corresponding vectors of the files. The method 100 comprises step 102, receiving a request including data to be stored. The request for storing the data may be received, for example, from a user via an application in a mobile terminal or software on a computer, etc. In some embodiments, the data to be stored may be any suitable type of data, for instance a text, image, sound, picture, video, or a combination of any of them. Taking an example where the data to be stored is a text message: "Hello world". Further, the method comprises step 104, decomposing the data to be stored byte to byte into a plurality of bytes. In some embodiments, the decomposing the data to be stored byte to byte can be further represented using different numeral systems. For example, the decimal numeral system, the binary number system, the octal number system, the hexadecimal number system. Each byte of the decomposed data is represented by a corresponding key value. For instance, if the decomposed data is represented in a hexadecimal number system, each byte in the data is represented by a hex value. The hex values are the key values for the bytes in the data. Taking the text message, "Hello world", as an example. When it is decomposed, the bytes may be represented by hex values as [48, 65, 6C, 6C, 6F, 20, 77, 6F, 72, 6C, 64], wherein "H" in the text message "Hello world", is represented by a corresponding hex value "48" in the decomposed data [48, 65, 6C, 6C, 6F, 20, 77, 6F, 72, 6C, 64]. Similarly, "l" in the text message "Hello world", appears three times, and is represented by a corresponding hex value "6C" in the decomposed data [48, 65, 6C, 6C, 6F, 20, 77, 6F, 72, 6C, 64] for each instance it appears in the text message. In step 106, vectorizing the decomposed data to obtain a first vector for the data to be stored. The first vector comprises at least one pair of values. Each pair of values comprises a first value and a second value. The first value represents one or more bytes having a unique key value in the decomposed data. The second value indicates instances of the one or more bytes having the unique key value presented in the decomposed data. Considering the example of the text message, "Hello world". The decomposed data, when vectorized, obtains a first vector {48=1, 65=1, 6C=3, 6F=2, . . . }. The first vector {48=1, 65=1, 6C=3, 6F=2, . . . } comprises, for example, a first pair of value "48=1", where "48" is the first value and "1" is the second value in the first pair of value "48=1". The first value "48" in the first pair of value "48=1" represents one or more bytes having a unique hex value "48" in the decomposed hexadecimal represented data [48, 65, 6C, 6C, 6F, 20, 77, 6F, 72, 6C, 64]. The second value "1" in the first pair of value "48=1" indicates only one instance of the one or more bytes having the unique hex value "48", i.e. H, presented in the decomposed hexadecimal represented data [48, 65, 6C, 6C, 6F, 20, 77, 6F, 72, 6C, 64]. Similarly, the second value "3" in the third pair of value "6C=3" in the first vector {48=1, 65=1, 6C=3, 6F=2, . . . } indicates three instances of the one or more bytes having the unique hex value "6C", i.e. l, presented in the decomposed hexadecimal represented data [48, 65, 6C, 6C, 6F, 20, 77, 6F, 72, 60, 64]. The method further comprises step 108, determining whether the vectorized data exists in the one or more data centers. The determining may comprise checking duplicates for vectorized data in the one or more data centers. Different following steps may be performed based on a result of the determination. In some embodiments, this step may be implemented by, for example, determining if all the pairs of values of the first vector exist in a vector of a file stored in the one or more data centers and, if yes, checking whether there is a duplicate of the data to be stored in the one or more data centers, which will be explained in details in conjunction to FIG. 1a of the application. Other embodiments, for example, where the data to be stored is determined to have no duplicates in the one or more data centers will be explained in conjunction to FIG. 1a of the application in the following. Finally, in step 110, returning a reference for the data to be stored based on a result of the determining step 108. In some embodiments, returning the reference may comprise returning a reference of a file determined in the one or more data centers. According to some embodiments, the determined file in the one or more data centers comprises all pairs of values in the first vector and the determined file is a duplicate of the data to be stored. The reference may include, for example, a reference id. The reference may be returned back to the same or different users, software on a computer, etc. The process will be explained in details below.

Figure 1A:
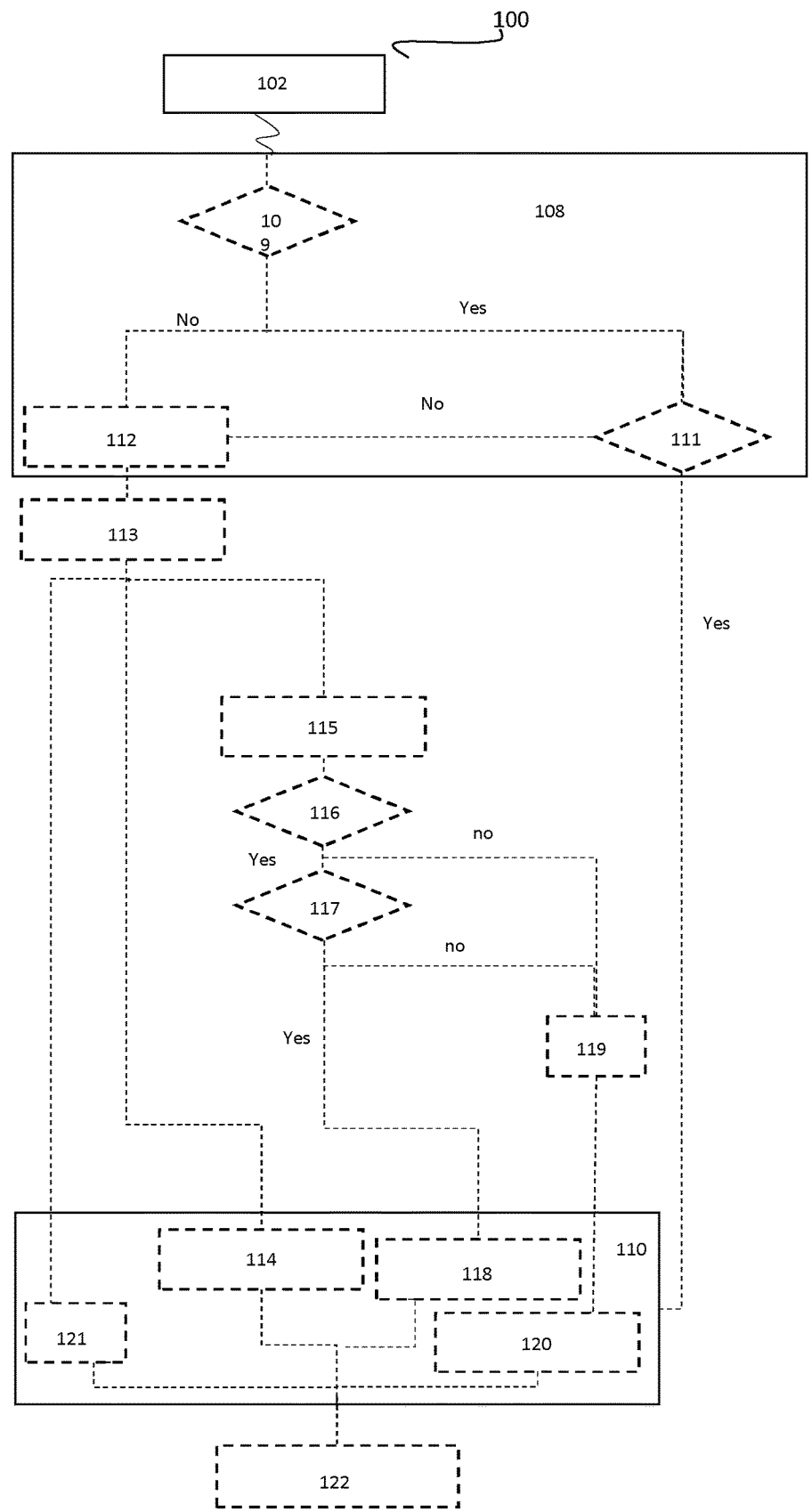
FIG. 1a shows an exemplary flow chart for a method for referencing data, performed additionally/alternatively by a processor operatively connected with one or more data centers in a network.

Referring to FIG. 1a, a flow chart is illustrated for a method 100 for referencing data, performed additionally/alternatively by a processor operatively connected with one or more data centers in a network. FIG. 1a illustrates even in further detail the different scenarios that may arise when referencing data. The steps 102 to 108 are performed as described in conjunction with FIG. 1. In step 108, the method determines whether the vectorized data exists in the one or more data centers. The determining may further comprise, step 109, i.e., comparing the first vector with the vectors in the one or more data centers, and step 111, i.e., determining whether the data to be stored is a duplicate of a first file already in the one or more data centers, if it is determined in step 109 that the first vector exists in the one or more data centers. The first file is corresponding to a vector having the same value pairs as the first vector. Considering the example of the text message, "Hello world". In the exemplary case, determining if all the pairs of values in the first vector {48=1, 65=1, 6C=3, 6F=2, . . . } exist in a vector of a file stored in the one or more data centers. If all the pairs of values in the first vector is determined to exist in a vector of a file stored in the one or more data centers. Step 111, i.e. the determining duplicate may be performed using any suitable ways. According to some embodiments, the duplicate is determined by checking the order of the bytes in the data to be stored. In other words, the data to be stored is compared with the first file byte to byte to determine whether the byte sequence in the data to be stored is same as the byte sequence in the first file. According to some other embodiments, the duplicate is determined by using hashing. In a case, if the sequence is the same, the data corresponding to the first vector is a duplicate of the first file already in the one or more data centers. If the data to be stored is a duplicate of the first file already in the one or more data centers, in step 110 the reference is returned to the user.

The reference may be a reference ID of the first file already stored in the one or more data centers. According to the invention, only the reference is returned and stored at the user side without awareness of the user. The method may further comprise, step 122, recomposing the data to be stored based on the reference. Recomposing may comprise restoring the data to be stored based on the reference to the first file already stored in the one or more data centers. According to some embodiments, the user may obtain the first file using the reference via the application in the mobile terminal, or software in a computer, without awareness of the user.

Returning to step 108 for further illustration of other different scenarios for referencing data. The step 109, i.e., comparing the first vector with the vectors in the one or more data centers. If, on comparing, it is found that the first vector does not exist in any of the one or more data centers, or if, on determining in step 111, it is found that the data to be stored is not a duplicate of a first file, performing step 112, i.e., choosing a vector in the one or more data centers with the highest similarity value compared with the first vector. According to some embodiments, the similarity value between the first vector and the chosen vector in the one or more data centers may be calculated using cosine similarity. The following explanation will be based on the similarity value calculated using cosine similarity. A scalar value between 0 and 1 will be returned after the calculation, thereby describing a value of similarity. If the similarity value returned is 1, that would indicate that the file corresponding to the chosen vector in the one or more data centers is most likely a duplicate of the first vector. Various other suitable methods may be used in calculating the similarity value. Therefore, the present invention is not limited to calculate the similarity value based on the cosine similarity. In step 113, determining one or more duplicate byte sequences both in the data to be stored and a second file corresponding to the chosen vector in step 112 in the one or more data centers. Wherein the length of the duplicate byte sequences is equal or less than a first threshold value. The threshold value may be, for example, any numeric value. And the second file corresponding to the chosen vector may be different or the same as the first file in the one or more data centers. The second file is the one corresponding to the chosen vector in the one or more data centers having the highest similarity. In step 114, returning a first reference to the second file. The first reference comprising one or more sub-references. Each sub-reference corresponds to one of the duplicate byte sequences respectively. And each sub-reference comprises an index and a range of the duplicate byte sequences in the second file. The index may be a file ID, for example file ID of the second file, which may be represented as FileID=i02. The range may be defined using a starting byte number in the file (e.g. second file) corresponding to the chosen vector, and a length of a number of bytes in the file (e.g. second file) corresponding to the chosen vector in the one or more data centers which is a duplicate of the one of the one or more duplicate byte sequences in the second file. Each of the sub-reference may have a following syntax: FileID_StartByte_length. Further, when the length of the byte sequences which are not found is less than a second threshold value, performing step 121, by injecting one or more byte sequences which are not found in the second file. Injecting may be performed as injecting a byte or a sequence of bytes when returning the reference in step 110. Usually, the second threshold value is less than the first threshold value. For example, if the data is represented in a hexadecimal number system, the injecting may be performed by injecting hex values for each byte in the one or more byte sequences which are not found in the second file. However, when the length of each of the byte sequences which are not found in the second file is equal or greater than the second threshold value, performing step 115, by vectorizing each of the byte sequences which are not found in the second file to obtain a respective second vector. The following steps 116 to 120 may be performed for each of the byte sequences. In step 116, determining whether the second vector exists in the one or more data centers. The determining in step 116 may further comprise comparing the second vector with the vectors in the one or more data centers. If the second vector exists in the one or more data centers, performing step 117, i.e., determining whether the byte sequence has a duplicate in a third file already in the one or more data centers. Wherein the third file is corresponding to a vector having the same value pairs as the second vector. The comparing and duplicate check steps are performed similarly as described above. If the byte sequence has a duplicate in the third file, performing step 118, i.e., returning a second reference. The second reference may be a reference ID of the third file or comprise an index and a range of the duplicate bytes in the third file. Specifically, when the byte sequence is a duplicate of the whole third file, the second reference may be the reference ID of the third file. When the byte sequence is a duplicate of part of the third file, the second reference may comprise an index and a range of the duplicate bytes in the third file. However, if the second vector does not exist in the one or more data centers or the byte sequence has no duplicate in the third file, performing step 119, i.e., adding the byte sequence into the one or more data centers. And thereby returning a third reference to the added byte sequence into the one or more data centers, in step 120. The third reference may be a reference ID of the byte sequence having no duplicate in the third file. The returned reference 110 for the data to be stored may comprise at least one of the first reference, the injected byte sequences, one or more the second reference and one or more the third reference. The method 100 may further comprise, step 122, i.e., recomposing the data to be stored based on the reference. Recomposing may comprise restoring the data to be stored based on the reference already stored in the one or more data centers.

Figure 2:
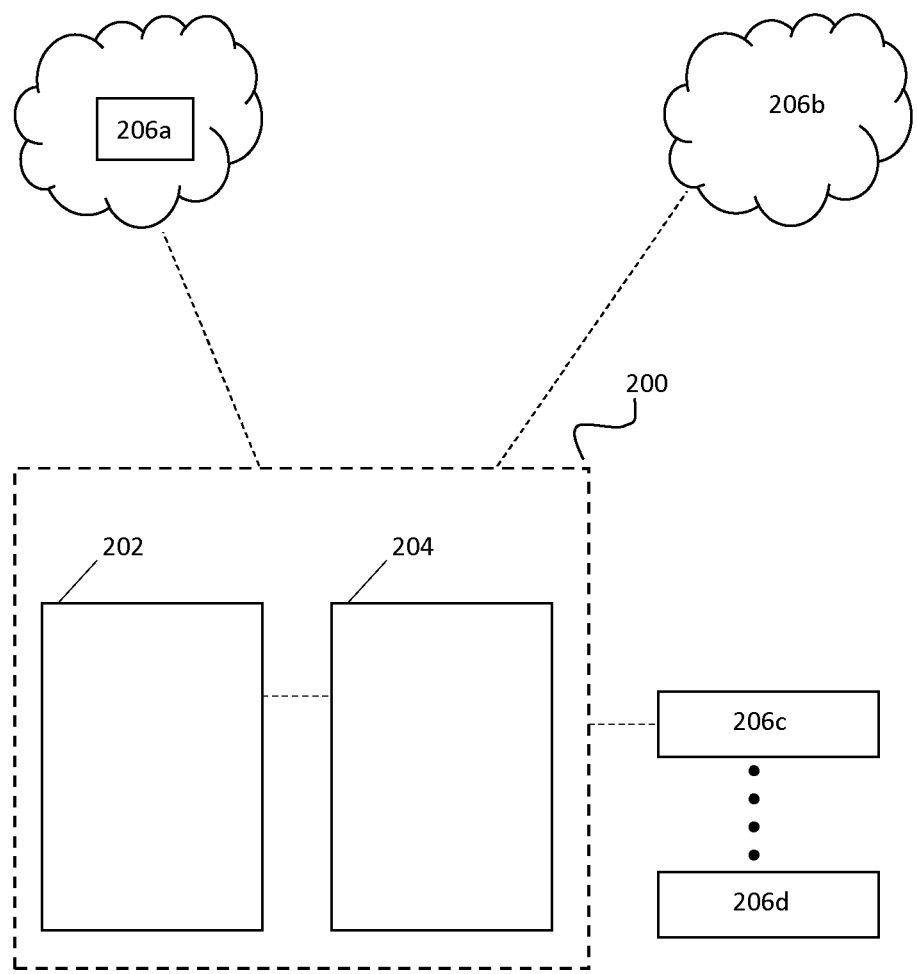
FIG. 2 schematically shows a system for referencing data.

Referring to FIG. 2, according to an embodiment thereof, a system 200 for referencing data comprising a processor 202 and a memory 204. The processor 202 in the system 200 is operatively connected with one or more data centers 206a, 206b, 206c, 206d in a network. The one or more data centers such as 206a, 206b may be located in remote networks, e.g. networks connected via internet, or cloud network etc. The one or more data centers such as 206c, 206d may also be located in local networks. Each of the one or more data centers 206a, 206b, 206c, 206d is configured to store files and corresponding vectors of the files. The memory 204 has stored thereon instructions. The instructions, when executed by the processor 202, cause the processor 202 to perform the method 100 of referencing data as described in conjunction with the previous figures. The memory 204 is shown to be independently connected to the processor 202. However, a person skilled in art will understand that the memory can be built-in the processor 202 or can be arranged to be configured externally to the system 200.

The memory 204 may be a non-transitory, computer-readable storage medium having stored thereon instructions. The instructions when executed by a computer, cause the computer to perform the method 100 of referencing data as described in conjunction with any or a combination of the FIGS. 1 and 1a.

The person skilled in the art realizes that the present invention by no means is limited to the preferred embodiments described above. On the contrary, many modifications and variations are possible within the scope of the appended claims. For example, the processor performing the method of referencing data is shown as a single processor. However, they can be provided as a group of processors performing some of the parts of the method jointly. Thus, the embodiments presented in the disclosure are for exemplary purpose and should not be construed as limiting the scope.

The invention claimed is:

1. A method for referencing data, performed by a processor operatively connected with one or more data centers in a network, each of the one or more data centers being configured to store files and corresponding vectors of the files, comprising:
receiving a request including data to be stored;
decomposing the data to be stored byte to byte into a plurality of bytes, each byte of the data being represented by a key value;
vectorizing the byte to byte decomposed data to obtain vectorized data including a first vector for the data to be stored, wherein the first vector includes at least one pair of values, each pair of values including a first value and a second value, wherein the first value represents one or more bytes having a unique key value in the byte to byte decomposed data, and the second value indicates instances of the one or more bytes having the unique key value presented in the byte to byte decomposed data;
determining whether the first vector is stored in the one or more data centers; and
returning a reference for the data to be stored based on a result of the determining.

2. The method according to claim 1, wherein the determining whether the first vector is stored in the one or more data centers and returning a reference for the data to be stored based on a result of the determining further comprise:
comparing the first vector with existing vectorized data stored in the one or more data centers;
if the first vector is stored in the one or more data centers, determining whether the data to be stored is a duplicate of a first file already in the one or more data centers, wherein the first file is corresponding to a vector having same value pairs as the first vector;
if the data to be stored is a duplicate of the first file already in the one or more data centers, returning the reference to a user, the reference being a reference identification (ID) of the first file already in the one or more data centers.

3. The method according to claim 1, wherein the determining whether the first vector is stored in the one or more data centers and returning a reference for the data to be stored based on a result of the determining further comprise:
comparing the first vector with existing vectorized data stored in the one or more data centers;
if the first vector does not exist in any of the one or more data centers or the data to be stored is not a duplicate of the first file already in the one or more data centers, choosing a vector in the one or more data centers having a highest similarity value with the first vector;
determining one or more duplicate byte sequences both in the data to be stored and a second file corresponding to the chosen vector in the one or more data centers, wherein a length of the duplicate byte sequences is equal or less than a first threshold value; and
returning a first reference, the first reference including one or more sub-references, each sub-reference corresponding to one of the duplicate byte sequences respectively, and each sub-reference including an index and a range of the duplicate byte sequences in the second file.

4. The method according to claim 3, further comprising:
injecting one or more byte sequences which are not found in the second file, wherein the length of the byte sequences which are not found is less than a second threshold value.

5. The method according to claim 4, further comprising:
vectorizing each of the byte sequences which are not found in the second file to obtain a respective second vector, wherein the length of each of the byte sequences which are not found in the second file is equal or greater than the second threshold value; performing the following (i) to (iv) for each of the byte sequences:
(i) determining whether the second vector is stored in the one or more data centers;
(ii) if the second vector is stored in the one or more data centers, determining whether the byte sequence has a duplicate in a third file already in the one or more data centers, wherein the third file is corresponding to a vector having same value pairs as the second vector;
(iii) if the byte sequence has a duplicate in the third file, returning a second reference, the second reference being a reference ID of the third file or including an index and a range of the duplicate bytes in the third file;
(iv) if the second vector does not exist in the one or more data centers or the byte sequence has no duplicate in the third file, adding the byte sequence into the one or more data centers and returning a third reference, the third reference being a reference identification (ID) of the byte sequence having no duplicate in the third file.

6. The method according to claim 5, wherein the returned reference for the data to be stored includes at least one of the first reference, the injected byte sequences, one or more the second reference and one or more the third reference.

7. The method according to claim 1, further comprising recomposing the data to be stored based on the reference.

8. The method according to claim 1, wherein the decomposing the data to be stored byte to byte comprises representing each byte in a hexadecimal form.

9. A system for referencing data, comprising a processor and a memory, the processor being operatively connected with one or more data centers in a network, each of the one or more data centers being configured to store files and corresponding vectors of the files, the memory having stored thereon instructions, when the instructions are executed by the processor, causing the processor to perform a method comprising:
receiving a request including data to be stored;
decomposing the data to be stored byte to byte into a plurality of bytes, each byte of the data being represented by a key value;
vectorizing the byte to byte decomposed data to obtain vectorized data including a first vector for the data to be stored, wherein the first vector includes at least one pair of values, each pair of values including a first value and a second value, wherein the first value represents one or more bytes having a unique key value in the byte to byte decomposed data, and the second value indicates instances of the one or more bytes having the unique key value presented in the byte to byte decomposed data;

determining whether the first vector is stored in the one or more data centers; and returning a reference for the data to be stored based on a result of the determining.

10. The system according to claim 9, wherein determining whether the first vector is stored in the one or more data centers and returning a reference for the data to be stored based on a result of the determining further comprises:

comparing the first vector with existing vectorized data stored in the one or more data centers;

if the first vector is stored in the one or more data centers, determining whether the data to be stored is a duplicate of a first file already in the one or more data centers, wherein the first file is corresponding to a vector having same value pairs as the first vector;

if the data to be stored is a duplicate of the first file already in the one or more data centers, returning the reference to a user, the reference being a reference identification (ID) of the first file already in the one or more data centers.

11. The system according to claim 9, wherein determining whether the first vector is stored in the one or more data centers and returning a reference for the data to be stored based on a result of the determining further comprise:

comparing the first vector with existing vectorized data stored in the one or more data centers;

if the first vector does not exist in any of the one or more data centers or the data to be stored is not a duplicate of the first file already in the one or more data centers, choosing a vector in the one or more data centers having a highest similarity value with the first vector;

determining one or more duplicate byte sequences both in the data to be stored and a second file corresponding to the chosen vector in the one or more data centers, wherein a length of the duplicate byte sequences is equal or less than a first threshold value; and returning a first reference, the first reference including one or more sub-references, each sub-reference corresponding to one of the duplicate byte sequences respectively, and each sub- reference including an index and a range of the duplicate byte sequences in the second file.

12. The system according to claim 11, further comprising: injecting one or more byte sequences which are not found in the second file, wherein the length of the byte sequences which are not found is less than a second threshold value.

13. The system according to claim 12, further comprising: vectorizing each of the byte sequences which are not found in the second file to obtain a respective second vector, wherein the length of each of the byte sequences which are not found in the second file is equal or greater than the second threshold value; performing the following (i) to (iv) for each of the byte sequences:

(i) determining whether the second vector is stored in the one or more data centers;

(ii) if the second vector is stored in the one or more data centers, determining whether the byte sequence has a duplicate in a third file already in the one or more data centers, wherein the third file is corresponding to a vector having same value pairs as the second vector;

(iii) if the byte sequence has a duplicate in the third file, returning a second reference, the second reference being a reference ID of the third file or including an index and a range of the duplicate bytes in the third file;

(iv) if the second vector does not exist in the one or more data centers or the byte sequence has no duplicate in the third file, adding the byte sequence into the one or more data centers and returning a third reference, the third reference being a reference ID of the byte sequence having no duplicate in the third file.

14. The system according to claim 13, wherein the returned reference for the data to be stored includes at least one of the first reference, the injected byte sequences, one or more the second reference and one or more the third reference.

15. A non-transitory, computer-readable storage medium having stored thereon instructions, when the instructions are executed by a processor operatively connected with one or more data centers in a network, each of the one or more data centers being configured to store files and corresponding vectors of the files, cause the processor to perform a method comprising:

receiving a request including data to be stored;

decomposing the data to be stored byte to byte into a plurality of bytes, each byte of the data being represented by a key value;

vectorizing the byte to byte decomposed data to obtain vectorized data that includes a first vector for the data to be stored, wherein the first vector includes at least one pair of values, each pair of values including a first value and a second value, wherein the first value represents one or more bytes having a unique key value in the byte to byte decomposed data, and the second value indicates instances of the one or more bytes having the unique key value presented in the byte to byte decomposed data;

determining whether the first vector is stored in the one or more data centers; and returning a reference for the data to be stored based on a result of the determining.

16. The non-transitory, computer-readable storage medium according to claim 15, wherein determining whether the first vector is stored in the one or more data centers and returning a reference for the data to be stored based on a result of the determining further comprises:

comparing the first vector with existing vectorized data stored in the one or more data centers;

if the first vector is stored in the one or more data centers, determining whether the data to be stored is a duplicate of a first file already in the one or more data centers, wherein the first file is corresponding to a vector having same value pairs as the first vector;

if the data to be stored is a duplicate of the first file already in the one or more data centers, returning the reference to a user, the reference being a reference identification (ID) of the first file already in the one or more data centers.

17. The non-transitory, computer-readable storage medium according to claim 15, wherein determining whether the first vector is stored in the one or more data centers and returning a reference for the data to be stored based on a result of the determining further comprise:

comparing the first vector with existing vectorized data stored in the one or more data centers;

if the first vector does not exist in any of the one or more data centers or the data to be stored is not a duplicate of the first file already in the one or more data centers, choosing a vector in the one or more data centers having a highest similarity value with the first vector;

determining one or more duplicate byte sequences both in the data to be stored and a second file corresponding to the chosen vector in the one or more data centers, wherein a length of the duplicate byte sequences is equal or less than a first threshold value; and returning a first reference, the first reference including one or more sub-references, each sub-reference corresponding to one of the duplicate byte sequences respectively, and each sub-reference including an index and a range of the duplicate byte sequences in the second file.

18. The non-transitory, computer-readable storage medium according to claim 17, further comprising:

injecting one or more byte sequences which are not found in the second file, wherein the length of the byte sequences which are not found is less than a second threshold value.

19. The non-transitory, computer-readable storage medium according to claim 18, further comprising:

vectorizing each of the byte sequences which are not found in the second file to obtain a respective second vector, wherein the length of each of the byte sequences which are not found in the second file is equal or greater than the second threshold value; performing the following (i) to (iv) for each of the byte sequences:

(i) determining whether the second vector is stored in the one or more data centers;

(ii) if the second vector is stored in the one or more data centers, determining whether the byte sequence has a duplicate in a third file already in the one or more data centers, wherein the third file is corresponding to a vector having same value pairs as the second vector;

(iii) if the byte sequence has a duplicate in the third file, returning a second reference, the second reference being a reference ID of the third file or including an index and a range of the duplicate bytes in the third file;

(iv) if the second vector does not exist in the one or more data centers or the byte sequence has no duplicate in the third file, adding the byte sequence into the one or more data centers and returning a third reference, the third reference being a reference ID of the byte sequence having no duplicate in the third file.

20. The non-transitory, computer-readable storage medium according to claim 19, wherein the returned reference for the data to be stored includes at least one of the first reference, the injected byte sequences, one or more the second reference and one or more the third reference.

* * * * *